(12) United States Patent
Saito et al.

(10) Patent No.: US 10,559,813 B2
(45) Date of Patent: Feb. 11, 2020

(54) NEGATIVE ELECTRODE FOR NONAQUEOUS ELECTROLYTE SECONDARY BATTERY AND NONAQUEOUS ELECTROLYTE SECONDARY BATTERY

(71) Applicant: KABUSHIKI KAISHA TOYOTA JIDOSHOKKI, Kariya-shi, Aichi (JP)

(72) Inventors: Atsushi Saito, Kariya (JP); Tatsuya Eguchi, Kariya (JP); Manabu Miyoshi, Kariya (JP); Jun Kaneda, Kariya (JP); Tomokuni Abe, Kariya (JP); Hiroki Oshima, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 142 days.

(21) Appl. No.: 15/565,006

(22) PCT Filed: Apr. 5, 2016

(86) PCT No.: PCT/JP2016/001915
§ 371 (c)(1),
(2) Date: Oct. 6, 2017

(87) PCT Pub. No.: WO2016/163115
PCT Pub. Date: Oct. 13, 2016

(65) Prior Publication Data
US 2018/0097223 A1   Apr. 5, 2018

(30) Foreign Application Priority Data
Apr. 10, 2015  (JP) .................. 2015-080926

(51) Int. Cl.
| | | |
|---|---|---|
| H01M 4/134 | (2010.01) | |
| H01M 4/587 | (2010.01) | |
| H01M 4/36 | (2006.01) | |
| H01M 4/62 | (2006.01) | |
| H01M 4/133 | (2010.01) | |
| H01M 4/38 | (2006.01) | |
| H01M 10/0525 | (2010.01) | |
| H01M 10/052 | (2010.01) | |
| H01M 4/02 | (2006.01) | |

(52) U.S. Cl.
CPC .......... H01M 4/134 (2013.01); H01M 4/133 (2013.01); H01M 4/364 (2013.01); H01M 4/386 (2013.01); H01M 4/587 (2013.01); H01M 4/622 (2013.01); H01M 10/0525 (2013.01); H01M 10/052 (2013.01); H01M 2004/021 (2013.01); H01M 2004/027 (2013.01)

(58) Field of Classification Search
CPC ....... H01M 4/133; H01M 4/364; H01M 4/386
See application file for complete search history.

(56) References Cited

U.S. PATENT DOCUMENTS

| | | | |
|---|---|---|---|
| 2011/0159370 A1 | 6/2011 | Inaba et al. | |
| 2013/0337323 A1* | 12/2013 | Ishikawa | ............... H01M 4/134 |
| | | | 429/211 |
| 2014/0127564 A1 | 5/2014 | Han et al. | |

FOREIGN PATENT DOCUMENTS

| | | |
|---|---|---|
| JP | 2008-159385 A | 7/2008 |
| JP | 2014-96356 A | 5/2014 |
| WO | 2010/050507 A1 | 5/2010 |
| WO | 2015/033827 A1 | 3/2015 |

OTHER PUBLICATIONS

International Search Report for PCT/JP2016/001915 dated Jul. 5, 2016 [PCT/ISA/210].
Communication dated Dec. 18, 2018 from the Japanese Patent Office in counterpart Application No. 2017-511472.

* cited by examiner

*Primary Examiner* — Ladan Mohaddes
(74) *Attorney, Agent, or Firm* — Sughrue Mion, PLLC

(57) ABSTRACT

The negative electrode includes a current collector, a negative electrode active material layer arranged on a surface of the current collector, and a protective layer arranged on a surface of the negative electrode active material layer. The negative electrode active material layer includes a first negative electrode active material having an aspect ratio defined as "a"/"b" to fall in a range of from two or more to eight or less when a length of the major axis is defined "a" and a length of the minor axis is defined "b." The protective layer includes a ceramic powder.

16 Claims, 1 Drawing Sheet

NEGATIVE ELECTRODE FOR NONAQUEOUS ELECTROLYTE SECONDARY BATTERY AND NONAQUEOUS ELECTROLYTE SECONDARY BATTERY

CROSS REFERENCE TO RELATED APPLICATIONS

This application is a National Stage of International Application No. PCT/JP2016/001915, filed on Apr. 5, 2016, which claims priority from Japanese Patent Application No. 2015-080926, filed on Apr. 10, 2015, the contents of all of which are incorporated herein by reference in their entirety.

TECHNICAL FIELD

The present invention relates to a negative electrode used for nonaqueous electrolyte secondary batteries such as lithium-ion secondary batteries, and to a nonaqueous electrolyte secondary battery using the negative electrode.

BACKGROUND ART

Lithium-ion secondary batteries have high charged and discharged capacities, and are batteries being able to make the outputs high. Currently, the lithium-ion secondary batteries have been used mainly as power sources for portable electronic appliances, and have further been expected as power sources for electric automobiles anticipated becoming wide spread from now on. A lithium-ion secondary battery comprises an active material, which is capable of inserting and eliminating (or sorbing and desorbing) lithium (Li), in the positive electrode and negative electrode, respectively. Moreover, the lithium-ion secondary battery is operated by moving the lithium ions between both the electrodes within an electrolyte.

In order to enhance the safety of a lithium-ion secondary battery, intending to prevent internal short-circuiting by providing the surface of an active material layer with a protective layer has been investigated. For example, Patent Application Publication No. 1 (i.e., Patent Publication (KOKAI) Gazette No. 2008-159385) discloses that the rise of battery temperature at the time of overcharging is inhibited by a ceramic coating layer on an electrode surface. Patent Application Publication No. 1 further discloses the following: using as a binder in the ceramic coating layer a thermoplastic polymer of which the melting point is from 110° C. to 150° C.; coating from 30% to 90% of a ceramic surface with the binder; melting the thermoplastic polymer in the ceramic coating layer under a high temperature of 110° C. or more to coat a surface of the active material layer, and then inhibiting the contact between an active material and an electrolyte.

Moreover, Patent Application Publication No. 2 (i.e., International Publication No. 2010/050507) discloses to arrange a porous layer comprising an electric insulating material on the surface of a negative electrode active material layer in order to inhibit a battery from swelling at the time of charging and discharging. Patent Application Publication No. 2 also discloses that a thickness of the porous layer becomes smaller by employing particles with uniform particle diameter as an electric insulating material.

Basically, the thicker a protective layer becomes, the more the internal resistance of a battery augments, so that the charged and discharged capacities of the battery declines. Moreover, in order to maintain the energy density of a battery, a thinner protective layer is preferable. However, in order to secure safety of a battery, a protective layer needs to have a certain extent of thickness.

Moreover, when a protective layer is provided on an active material layer and a coarseness in the surface of the active material layer is large, the thickness of the protective layer is preferably the coarseness in the surface of the active material layer or more. Consequently, the thickness of the protective layer may lower charged and discharged capacities of a battery extremely.

From the above, an electrode for nonaqueous electrolyte secondary battery on which a protective layer enhancing safety without greatly lowering charged and discharged capacities has been desired.

CITATION LIST

Patent Literature

Patent Application Publication No. 1: Japanese Unexamined Patent Publication (KOKAI) Gazette No. 2008-159385; and Patent Application Publication No. 2: Internal Publication No. 2010/050507

SUMMARY OF THE INVENTION

Technical Problem

The present invention is made in view of such circumstances. An object to be solved is providing a negative electrode for nonaqueous electrolyte secondary battery on which a protective layer enhancing safety without greatly lowering charged and discharged capacities is arranged, especially, on which a protective layer having less unevenness in the thickness is arranged; and a nonaqueous electrolyte secondary battery using the negative electrode.

Solution to Problem

Hence, the present inventors found out that: a roughness is made smaller in a surface of the negative electrode active material layer by letting a negative electrode active material layer include a first negative electrode active material which has an aspect ratio defined as "a"/"b" to fall in a range of from two or more to eight or less when defining a length of the major axis "a" and a length of the minor axis "b"; moreover, unevenness is reduced in the thickness of a protective layer by making a roughness smaller in a surface of the active material layer; in addition, safety is secured by such a protective layer.

Specifically, a negative electrode for nonaqueous electrolyte secondary battery according to the present invention comprises:

a current collector;

a negative electrode active material layer arranged on a surface of the current collector; and a protective layer arranged on a surface of the negative electrode active material layer;

the negative electrode active material layer including a first negative electrode active material having an aspect ratio defined as "a"/"b" to fall in a range of from two or more to eight or less when a length of a major axis thereof is defined "a" and a length of a minor axis thereof is defined "b";

the protective layer including a ceramic powder.

The first negative electrode active material includes preferably Si.

The negative electrode active material layer further includes preferably a second negative electrode active material having the aspect ratio which falls in a range of from one or more to less than two.

The second negative electrode active material includes preferably graphite.

An average of the aspect ratio of the first negative electrode active material is preferably more than an average aspect ratio of the second negative electrode active material.

An average particle diameter "$D_{50}$" of the first negative electrode active material falls preferably in a range of from 0.3 μm or more to 20 μm or less.

The first negative electrode active material includes preferably a silicon material having a structure in which plate-shaped silicon bodies are laminated in a thickness direction thereof.

An average particle diameter "$D_{50}$" of the second negative electrode active material falls preferably in a range of from 0.1 μm or more to 20 μm or less.

The first negative electrode active material is preferably 50 parts by mass or more based on 100 parts by mass of the negative electrode active material layer.

A maximum height in a surface of the negative electrode active material layer is preferably 2 μm or less. Note herein that a "maximum height" is defined as a distance between a first parallel line (or a peak line) and a second parallel line (or a valley line) in a scanning electron microscope image in a cross section of the negative electrode active material layer; wherein the first parallel line passes through a top point (or an uppermost point) in the thickness direction of a curved line on the surface opposite to the current-collector-side surface of the negative electrode active material layer, and is parallel to the surface of the current collector; and the second parallel line passes through a bottom point (or a lowermost point) in the thickness direction of the curved line, and is parallel to the surface of the current collector.

An average particle diameter "$D_{50}$" of the ceramic powder falls preferably in a range of from 0.1 μm or more to 2 μm or less.

A thickness of the protective layer falls preferably in a range of from 1 μm or more to 6 μm or less.

The protective layer includes preferably a water-based binder.

The water-based binder is preferably a water-soluble binder.

The water-soluble binder is preferably polyvinyl alcohol or polyacrylic acid.

A nonaqueous electrolyte secondary battery according to the present invention comprises the aforementioned negative electrode for nonaqueous electrolyte secondary battery.

Advantageous Effects of the Invention

In the negative electrode for nonaqueous electrolyte secondary battery according to the present invention, prescribing configurations or forms of the negative electrode active materials, which are included in the negative electrode active material layer, results in that the thickness unevenness of the protective layer on the negative electrode active material layer is reduced. Moreover, a nonaqueous electrolyte secondary battery comprising the present negative electrode for nonaqueous electrolyte secondary battery is highly safe.

DESCRIPTION OF THE EMBODIMENTS

Figure 1:
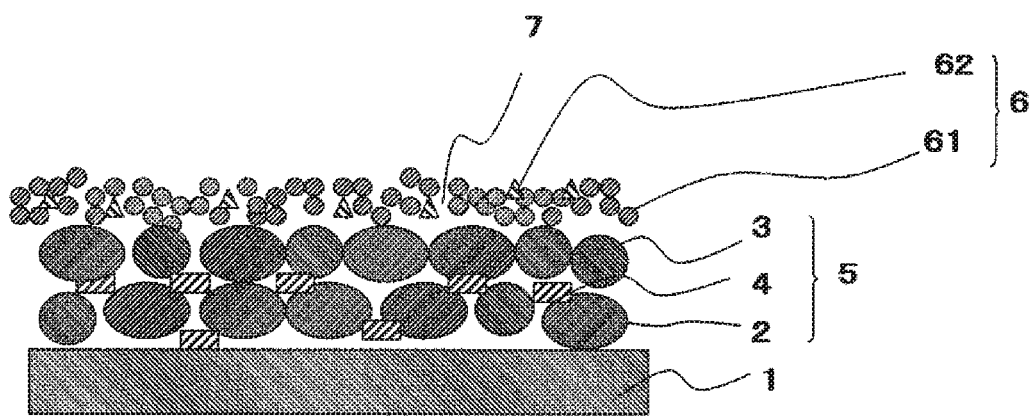
FIG. 1 is a schematic diagram illustrating a negative electrode for nonaqueous electrolyte secondary battery according to one of the present embodiments.

Negative Electrode for Nonaqueous Electrolyte Secondary Battery

A negative electrode for nonaqueous electrolyte secondary battery according to the present invention comprises a current collector, a negative electrode active material layer arranged on a surface of the current collector, and a protective layer arranged on a surface of the negative electrode active material layer. A nonaqueous electrolyte secondary battery according to the present invention is preferably a lithium-ion secondary battery. Explanations will be hereinafter made while taking a lithium-ion secondary battery as an example.

Current Collector

A current collector is a constituent for taking electricity in and out in a nonaqueous electrolyte secondary battery, exhibits high electron conductivity, and is made using a material which is inactive electrochemically at the time of charging and discharging. Examples of a material for the current collector include metallic materials, such as stainless steels, titanium, nickel, aluminum and copper; and conductive resins. In particular, from the aspects of electric conductivity, processibility and cost, aluminum or copper is preferable as a material for the current collector. A preferable configuration or form of the current collector is one of the following: foils, sheets, films, linear shapes, rod-like shapes, or meshes. A preferable current collector to be used is a metallic foil, such as a copper foil, a nickel foil, an aluminum foil, or a stainless-steel foil, for instance. When a foil, sheet or film makes the current collector, a thickness of the current collector falls preferably in a range of from 10 μm to 50 μm. From the viewpoint of making battery capacities higher while retaining high strength for the current collector, the thickness of the current collector falls especially preferably in a range of from 15 μm to 30 μm.

Negative Electrode Active Material Layer

The negative electrode active material layer includes a first negative electrode active material. Moreover, the negative electrode active material layer further includes a binder for negative electrode active material layer, and a conductive additive, if needed.

The first negative electrode active material has an aspect ratio which is defined as by "a"/"b" to fall in a range of from two or more to eight or less when a length of the major axis is defined "a" and a length of the minor axis is defined "b." When the aspect ratio is larger than eight, the first negative electrode active material may suffer from being broken down upon subjected to pressing at the time of fabricating an electrode. Note herein that the longest diameter of the first negative electrode active material is defined the length of the major axis, and the shortest diameter of the first negative electrode active material is defined the length of the minor axis. In the present invention, a configuration of which the aspect ratio is from two or more to eight or less is referred to as a "flat shape." Moreover, another configuration of which the aspect ratio is from one or more to less than two is referred to as a "spherical shape."

The aspect ratio is measured as described below, for instance.

The first negative electrode active material is photographed by a scanning electron microscope. Then, for 10 pieces of the particles within an arbitrarily-selected area, the largest diameter of the individual particles is defined the major-axis length "a" and the shortest diameter is defined the minor-axis length "b" to find the "a"/"b" ratios, respectively. The 10-piece "a"/"b" ratios are labeled aspect ratios of the sample, and an average of the 10-piece "a"/"b" ratios is regarded as an average of the aspect ratios of the sample. Since the first negative electrode active material does not have any great variation in the configuration, the aspect ratios of the 10-piece particles represent an aspect ratio of the sample as a whole.

Including the first negative electrode active material with a flat shape results in making a surface roughness of the negative electrode active material layer smaller. The flat-shaped first negative electrode active material tends to be oriented so that the flat-shaped face becomes parallel to a surface of the current collector in a surface of the negative electrode active material layer at the time of preparing the negative electrode active material layer. Consequently, due to the fact that the flat-shaped first negative electrode active material is included in the negative electrode active material layer, a surface roughness of the negative electrode active material layer tends to be smaller.

A surface roughness of the negative electrode active material layer is represented by a maximum height. The maximum height is measured as described below, for instance.

First of all, an image is acquired by observing a section in a negative electrode, which has a current collector and negative electrode active material layer at least, with a scanning electron microscope, for instance, at a magnification of 1,000 times. The negative electrode further includes a protective layer, if needed.

The acquired image is subjected to image processing to obtain a curved line of the cross section of the negative electrode active material layer on the surface opposite to the current-collector-side surface.

Since the curved line does not have any great difference in the longitudinal direction, a location is specified arbitrarily over a length of 100 µm in the longitudinal direction to find a maximum height in the region.

A distance is gauged or measured mechanically between a first parallel line (or a peak line) and a second parallel line (or a valley line). The first parallel line passes through a top point (or an uppermost point) in the thickness direction of the curved line on the surface opposite to the current-collector-side surface of the cross section of the negative electrode active material layer, and is parallel to the surface of the current collector. The second parallel line passes through a bottom point (or a lowermost point) in the thickness direction of the curved line, and is parallel to the surface of the current collector. Then, the distance, namely, a height difference between the highest top point and the lowest bottom point, is defined as a maximum height.

In the surface of the negative electrode active material layer, the maximum height, which is gauged or measured mechanically by the aforementioned method, is preferably less than 4 µm, or more preferably 2 µm or less.

The major-axis length "a" of the first negative electrode active material falls preferably within a range of from 2 µm or more to 24 µm or less, or more preferably within a range of from 4 µm or more to 16 µm or less. The minor-axis length "b" of the first negative electrode active material falls preferably within a range of from 1 µm or more to 3 µm or less, or more preferably within a range of from 1 µm or more to 2 µm or less.

An average particle diameter "$D_{50}$" of the first negative electrode active material falls preferably in a range of from 0.3 µm or more to 20 µm or less, or more preferably in a range of from 4 µm or more to 10 µm or less.

The average particle diameter "$D_{50}$" is measured by a grain size distribution measurement method. The "average particle diameter '$D_{50}$'" refers to a particle diameter which corresponds to a volumetric distribution integrated value making 50% in measuring a grain size distribution by a laser diffractometry. That is, the average particle diameter "$D_{50}$" signifies a median diameter measured on a volumetric basis.

The first negative electrode active material is preferably 50 parts by mass or more, or is more preferably 58 parts by mass or more, based on 100 parts by mass of the negative electrode active material layer.

As a material of the aforementioned flat-shaped first negative electrode active material, carbon-based materials, and Si-based materials are shown, for instance. As a carbon-based material, natural graphite is shown.

The flat-shaped first negative electrode active material is preferably an Si-based material. The Si-based material includes Si. Si has high charged and discharged capacities. Consequently, when the first negative electrode active material is an Si-based material, nonaqueous electrolyte secondary batteries with high capacities are likely to be fabricated.

A silicon material which the present inventors studied especially will be explained hereinafter. For example, the silicon material explained below may be used as a flat-shaped Si-based material.

A silicon material to be used may be a silicon material, which is disclosed in International Publication No. 2014/080608 and which is obtained from $CaSi_2$ via a decalcification reaction. For example, the silicon material is obtained by subjecting a product, which is obtained by treating $CaSi_2$ with an acid, such as hydrochloric acid or hydrogen fluoride, for instance, to a heating treatment (being also referred to as "calcination") at from 300° C. to 1,000° C., for instance.

The aforementioned silicon material is a silicon material comprising a structure in which plate-shaped silicon bodies are laminated in the thickness direction. The structure of the silicon material, of which plate-shaped silicon bodies are laminated in the thickness direction, is ascertained by observation with a scanning electron microscope, and the like. The plate-shaped silicon bodies preferably have a thickness falling within a range of from 10 nm to 100 nm, or more preferably within a range of from 20 nm to 50 nm. Moreover, the plate-shaped silicon bodies have preferably a major-axis-direction length falling within a range of from 0.1 µm to 50 µm. In addition, the plate-shaped silicon bodies exhibit preferably a ratio, (Major-axis-direction Length)/(Thickness), falling within a range of from two to 1,000.

The silicon material is preferably turned into particles having a constant grain size distribution via pulverization or classification. A preferable grain size distribution of the silicon material is the "$D_{50}$" falling within a range of from 1 µm to 30 µm, for example, when measured by a common laser diffraction apparatus for measuring grain size distribution.

The aforementioned silicon material has an aspect ratio of which the value makes from two or more to eight or less when the aspect ratio is defined as "a"/"b" where the major-axis length is defined "a" and the minor-axis length is defined "b." The silicon material is obtained via a decalcification reaction. Since planes, from which calcium is pulled off $CaSi_2$ at a time of the decalcification reaction, have been fixed or settled already, the silicon material has an aspect ratio defined as "a"/"b" which is from two or more to eight or less.

When employing the aforementioned silicon material as a negative electrode active material for nonaqueous electrolyte secondary battery, such as lithium-ion secondary battery, the silicon material to be used is preferably covered with carbon. Hereinafter, the silicon material covered with carbon is referred to as an "Si/C composite." The Si/C composite is shown as one of the Si-based materials.

Si/C Composite

In the Si/C composite, a carbon layer covers the surface of Si or Si compound at least. Note that carbon constituting the carbon layer is preferably one of the following: amorphous carbon alone, crystalline carbon alone, and amorphous carbon and crystalline carbon intermingled one another, for instance.

Although the step of carbonizing is not at all limited especially, the following are shown as for a carbonization step: a step of mixing (or mechanically milling, for instance) a carbon powder and Si or an Si compound powder one another; a step of heat treating a mixture obtained from compositing a resin and Si or an Si compound powder one another; or a step of making Si or an Si compound powder contact with an organic-substance gas under a non-oxidizing atmosphere and then heating the former to carbonize the organic-substance gas; and the like.

The negative electrode active material layer further includes preferably a second negative electrode active material of which the aspect ratio falls in a range of from one or more to less than two. An average of the aspect ratios of the second negative electrode active material is preferably smaller than an average of the aspect ratios of the first negative electrode active material.

As for the second negative electrode active material, negative electrode active materials having a spherical configuration are shown. Combining the spherical-shaped second negative electrode active material with the flat-shaped first negative electrode active material results in making the surface roughness of the negative electrode active material layer much smaller.

The second negative electrode active material to be used is preferably one or more the following: carbon-based materials being capable of occluding and releasing (or sorbing and desorbing) lithium; elements being capable of alloying with lithium; compounds comprising an element being capable of alloying with lithium; or polymeric materials.

Examples of the carbon-based material are as follows: non-graphitizable carbon, artificial graphite, natural graphite, cokes, graphites, glassy carbons, organic-polymer-compound calcined bodies, carbon fibers, activated carbon, or carbon blacks. Note herein that the "organic-polymer-compound calcined bodies" refer to calcined bodies carbonized by calcining polymeric materials, such as phenols and furans, at a proper temperature.

Examples of the element being capable of alloying with lithium are as follows: Na, K, Rb, Cs, Fr, Be, Mg, Ca, Sr, Ba, Ra, Ti, Ag, Zn, Cd, Al, Ga, In, Si, Ge, Sn, Pb, Sb, and Bi. The element being capable of alloying with lithium is preferably silicon (Si), or tin (Sn), more preferably, silicon (Si).

Examples of the compound comprising an element being capable of alloying with lithium are as follows: ZnLiAl, AlSb, $SiB_4$, $SiB_6$, $Mg_2Si$, $Mg_2Sn$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ (where $0<"v"\leq2$), $SnO_w$ (where $0<"w"\leq2$), $SnSiO_3$, LiSiO, or LiSnO. A preferable compound comprising an element being capable of alloying with lithium is silicon compounds, or tin compounds. A preferable example of the silicon compound is $SiO_x$ (where $0.3\leq"x"\leq1.6$). Examples of the tin compound are tin alloys (e.g., Cu—Sn alloys, or Co—Sn alloys, and the like).

A preferable polymeric material is polyacetylene, or polypyrrole, for instance.

The average particle diameter "$D_{50}$" of the second negative electrode active material falls preferably in a range of from 0.5 times or more to 10 times or less of the average particle diameter "$D_{50}$" of the first negative electrode active material, or more preferably in a range of from one time or more to five times or less thereof.

The average particle diameter "$D_{50}$" of the second negative electrode active material falls preferably in a range of from 0.1 μm or more to 20 μm or less, more preferably in a range of from 5 μm or more to 18 μm or less, or much more preferably in a range of from 10 μm or more to 17 μm or less.

The first negative electrode active material falls preferably in a range of from 65% by mass or more to 100% by mass or less, more preferably in a range of from 68% by mass or more to 100% by mass or less, or much more preferably in a range of from 70% by mass or more to 100% by mass or less, based on 100% by mass of a sum of the first negative electrode active material and second negative electrode active material.

When an Si-based material is used as the first negative electrode active material, graphite is used preferably as the second negative electrode active material. The graphite is capable of functioning as a conductive additive as well.

A conductive additive is added to an active material layer, if needed, in order to enhance the electric conductivity of an electrode. One of the following is employed independently for the conductive additive, or two or more of the following are combined threrefor: carbonaceous fine particles, such as carbon black, graphite, acetylene black (or AB (abbreviation)) and KETJENBLACK (registered trademark (or KB (abbreviation))); or gas-phase-method carbon fibers (or VGCF (abbreviation)). Although an employment amount of the conductive additive is not at all restrictive especially, the amount is set preferably so as to fall in a range of from one part by mass to 30 parts by mass approximately, for instance, with respect to 100 parts by mass of active materials to be contained in an electrode.

The binder for negative electrode active material layer performs a role of fastening the aforementioned negative electrode active materials and conductive additive together onto the current collector.

Some of the example of the binder for negative electrode active material layer are as follows: fluorine-containing resins, such as polyvinylidene fluoride (or PVDF (abbreviation)), polytetrafluoroethylene, tetrafluoroethylene/hexafluoropropylene (or FEP (abbreviation)) copolymers, and fluororubber; thermoplastic resins, such as polypropylene and polyethylene; imide-based resins, such as polyimide and polyamide-imide; acrylic resins, such as poly(meth) acrylic acid; alkoxysilyl group-containing resins; styrene-butadiene rubber, carboxymethyl cellulose; polyethylene glycol; and polyacrylonitrile. A preferable binder for negative electrode active material layer is PVDF, or polyamide-imide.

A compounding proportion of the binder for negative electrode active material layer within the negative electrode active material layer makes preferably such a ratio as (Negative Electrode Active Material):(Binder for Negative Electrode Active Material Layer) is equal to from 1:0.001 to 1:0.3 by mass. The mass ratio, (Negative Electrode Active Material):(Binder for Negative Electrode Active Material Layer), is more preferably equal to from 1:0.005 to 1:0.2, or is much more preferably equal to from 1:0.01 to 1:0.15. When the binder for negative electrode active material layer is too less, the formability of an electrode may suffer from declining. Moreover, when the binder for negative electrode active material layer is too much, the energy density of an electrode may suffer from lowering.

The negative electrode active material layer is arranged onto a surface of the current collector, for instance, in the following manner: a composition, which includes the negative electrode active materials and binder for negative electrode active material layer, as well as a conductive additive, if needed, is prepared for forming the negative electrode active material layer; the composition is turned into a paste-like composition by further adding a proper solvent thereto; and then the composition is dried after having been applied or coated onto a surface of the current collector. The drying operation is carried out satisfactorily under an ordinary pressure condition, or under a reduced pressure condition using a vacuum drier. A drying temperature is set up suitably. Note that, in order to enhance an electrode density, the current collector, on which the negative electrode active material layer has been arranged, is compressed preferably.

A method to be used for applying or coating the composition for the negative electrode active material layer is a method, which has been known publicly so far, such as roll coating, dip coating, doctor blade coating, spray coating, curtain coating, lip coating, comma coating, or die coating.

The solvent to be used for viscosity adjustment is, for instance, at least one of the following: water, N-methyl-2-pyrrolidone, methanol, methyl isobutyl ketone, N,N-dimethylformamide (or DMF), dimethylsulfoxide (or DMSO), γ-butyrolactone, or acetone.

Protective Layer

The protective layer is arranged on a surface of the negative electrode active material layer, and includes a ceramic powder. The protective layer further includes a binder for protective layer, if needed.

A great many ceramic powders are included in the protective layer.

The ceramic powder to be used is a powder insoluble in a solvent. That is, a desirable ceramic powder is made of oxide, nitride, or carbide. The ceramic powder is, for instance, one or more of the following: $Al_2O_3$, $SiO_2$, $TiO_2$, $ZrO_2$, MgO, SiC, AlN, BN, talc, mica, kaolinite, CaO, ZnO, and zeolite. A preferable ceramic powder is $Al_2O_3$, $SiO_2$ or $TiO_2$, for such reasons as availability and accessibility. A more preferable option is $Al_2O_3$.

The average particle diameter "$D_{50}$" of the ceramic powder falls preferably in a range of from 100 nm or more to 2 µm or less, more preferably in a range of from 100 nm or more to 1 µm or less, much more preferably in a range of from 200 nm or more to 800 nm or less, or especially preferably in a range of from 300 nm or more to 600 nm or less. When the average particle diameter "$D_{50}$" of the ceramic powder is too large, the protective layer may adversely become larger than a desirable thickness. Moreover, the ceramic powder becomes likely to sediment within a slurry at the time of forming the protective layer, so that the ceramic powder may adversely be less likely to disperse. When the average particle diameter "$D_{50}$" of the ceramic powder is too small, the ceramic powder may adversely get into the interior of the negative electrode active material layer at the time of preparing the protective layer.

The average particle diameter "$D_{50}$" of the ceramic powder falls preferably in a range of from 1/20 times or more to one time or less of the average particle diameter "$D_{50}$" of the first negative electrode active material, more preferably in a range of from 1/15 times or more to one time or less thereof, or much more preferably in a range of from 1/10 times or more to one time or less thereof. When the average particle diameter "$D_{50}$" of the ceramic powder is too small with respect to the average particle diameter "$D_{50}$" of the first negative electrode active material, the ceramic powder may adversely get into the interior of the negative electrode active material layer at the time of preparing the protective layer.

Since the ceramic powder has low electric conductivity but has high heat resistance, the protective layer having both insulating properties and heat-resistance properties comes to be arranged on a surface of the negative electrode active material layer. Consequently, even under high temperatures, internal short-circuiting in a nonaqueous electrolyte secondary battery is inhibited.

Moreover, since a surface of the negative electrode active material layer is coated by the protective layer, the negative electrode active materials are less likely to contact with a nonaqueous electrolyte directly. Consequently, decomposition reactions of the nonaqueous electrolyte by the negative electrode active materials are inhibited, so that the cyclabilities of a nonaqueous electrolyte secondary battery are inhibited from worsening. Moreover, since metallic-component eluted substances included in the nonaqueous electrolyte, or decomposition products of the nonaqueous electrolyte are trapped physically with the protective layer, the decomposition products, and the like, are inhibited from depositing onto a surface of the negative electrode active material layer. As a consequence thereof, the cyclabilities of a nonaqueous electrolyte secondary battery are inhibited from worsening.

In the protective layer including the ceramic powder, pores are formed between ceramic powders. Since the protective layer has the pores, the protective layer exhibits ionic conductivity. Consequently, the protective layer does not all make a large resistance in a nonaqueous electrolyte secondary battery, so that the protective layer does not bring about any significant decline in battery capacities of the nonaqueous electrolyte secondary battery.

The binder for protective layer binds the active material layer with the protective layer together, and binds the ceramic powders together inside the protective layer.

Note that, when an organic solvent-based binder is used for the negative electrode active material layer and when the organic solvent-based binder is used for the protective layer as well, the organic solvent-based binder may adversely be dissolved partially in an organic solvent used upon forming the protective layer.

When an organic solvent-based binder is used for the negative electrode active material layer, a water-based binder is preferable as for the binder for protective layer. The "water-based binder" indicates resin dissolving or dispersing in a water-based solvent, or rubber dissolving or dispersing in a water-based solvent. As the water-based binder, water-soluble binders, and water-dispersing binders are shown. Note herein that the "water-based solvent" refers to water, or mixtures of water and alcohol. As for the alcohol, ethanol, methanol, isopropanol, and butanol are shown, for instance. A compounding ratio between water and alcohol in the mixture makes preferably such a ratio as (Water):(Alcohol) is equal to from 50:50 to 99:1 by mass.

As for the water-based binder, a water-based binder of which the glass transition point is 60° C. or more is preferable, or a water-based binder of which the glass transition point is 80° C. or more is more preferable. Since the actual service temperature range of a nonaqueous electrolyte secondary battery lies at around 60° C. or less approximately, the water-based binder does not soften desirably up until 60° C. approximately. When the glass transition point of the water-based binder is 60° C. or more, the water-based binder does not soften even at high temperatures up to 60° C. approximately. Consequently, the longevity and safety of a nonaqueous electrolyte secondary battery at high temperatures are secured. Moreover, when a water-based binder of which the glass transition point is 60° C. or more is used, a polymeric skeleton in the water-based binder is considered hard, or an intermolecular cohesive force therein is considered high. Using the water-based binder of which the glass transition point is 60° C. or more leads to forming the protective layer with high strength. Consequently, even when using the negative electrode active materials which expand and contract as accompanied by the occlusion and release (or sorption and desorption) of Li, the protective layer inhibits the negative electrode active materials within the active material layer from expanding and contracting.

An example of water-soluble binder is as follows: methyl cellulose, hydroxypropyl cellulose, carboxymethyl cellulose, polystyrene sulfonate, polyvinyl sulfonate, polyacrylic acid, sodium polyacrylate, polyacrylate styrene copolymers, methylvinylether/maleic anhydride copolymers, polyacrylamide, polyethylene oxide, polyvinyl alcohol, acrylic acid/maleic acid copolymers, acrylic acid/sulfonic acid-based monomers, hydroxyethyl cellulose, acrylamide-diallyl dimethylammonium chloride, diallyl dimethylammonium chloride, poly(methacrylate trimethyl aminoethyl-methyl sulfate), isobutyl-maleic anhydride, chitosan, polyvinyl butyral, polyethylene glycol, gelatin, polyvinyl ethylether, polyvinyl acetate, polyvinyl pyrrolidone, and polypropylene oxide.

Among the aforementioned water-soluble binders, binders of which the glass transition point is 60° C. or more are more preferable. Although the preference depends on the polymerization degrees or the copolymeric composition rates, the water-soluble binder of which the glass transition point is 60° C. or more is one or more of the following, for instance: methyl cellulose, hydroxypropyl cellulose, carboxymethyl cellulose, polystyrene sulfonate, polyvinyl sulfonate, polyacrylic acid, sodium polyacrylate, polyacrylate styrene copolymers, methylvinylether/maleic anhydride copolymers, polyacrylamide, polyvinyl alcohol, acrylic acid/maleic acid copolymers, acrylic acid/sulfonic acid-based monomers, hydroxyethyl cellulose, acrylamide-diallyl dimethylammonium chloride, isobutyl-maleic anhydride, chitosan, polyvinyl butyral, gelatin, and polyvinyl pyrrolidone.

The water-soluble binder is preferably polyvinyl alcohol, or polyacrylic acid.

An example of the water-dispersing binder as follows: acryl-based polymers, methacryl-based polymers, polyurethane, epoxy polymers, styrene polymers, and vinyl polymers. One of the water-dispersing binders is used independently, but two or more of the water-dispersing binders are combined or made into a copolymer, if needed.

When using an organic solvent-based binder as the binder for protective layer, at least one of the following is used preferably as the organic solvent-based binder, for instance: fluorine-containing resins, such as polyvinylidene fluoride (or PVDF (abbreviation)), polytetrafluoroethylene, tetrafluoroethylene/hexafluoropropylene (or FEP (abbreviation)) copolymers, and fluororubber; thermoplastic resins, such as polypropylene and polyethylene; imide-based resins, such as polyimide and polyamide-imide; acrylic resins, such as poly(meth)acrylic acid; and alkoxysilyl group-containing resins.

Note that the protective layer further includes a dispersing agent as well, if needed. A suitably employed dispersing agent is one of commercially available dispersing agents.

A ratio between the ceramic powder and the binder for protective layer in the protective layer falls preferably in such a range as from 86:14 to 99:1 by mass, more preferably in such another range as from 87:13 to 98:2 by mass, or much more preferably in such still another range as from 88:12 to 97:3 by mass. When the content of the binder for protective layer is too less in the protective layer, the binding force of the protective layer to the negative electrode active material layer may decline adversely, or the binding force between the ceramic powders may decline adversely to result in collapses of the protective layer. Beside, the flexibility of the protective layer as a whole may be lost adversely, so that the protective layer is broken by pressures applied to an electrode. When the content of the binder for protective layer is too much in the protective layer, the heat resistance of the protective layer may decline adversely.

Moreover, an amount of the ceramic powder in the protective layer is preferably such an extent of amount that pores remain between the ceramic powders. When the pores between the ceramic powders become less, the ionic conductivity of the protective layer declines, so that battery capacities may be less likely to be secured.

The protective layer has a thickness falling preferably in a range of from 1 µm or more to 12 µm or less, more preferably in a range of from 1 µm or more to 9 µm or less, or especially preferably in a range of from 1 µm or more to 6 µm or less. When the thickness of the protective layer is too small, the advantageous effect of inhibiting a nonaqueous electrolyte secondary battery from short-circuiting may not be demonstrated. When the thickness of the protective layer is too large, the charged and discharged capacities of a nonaqueous electrolyte secondary battery may decline adversely. Note herein that the "thickness" of the protective layer is found by subtracting a thickness of the electrode, which is prior to forming the protective layer, from another thickness of the electrode, which is provided with the protective layer. The thickness of the respective electrodes refers to an average of results of measuring the respective electrodes at 10 points at intervals of 5 mm.

A method for arranging the protective layer onto the negative electrode active material layer is not limited especially. For example, the protective layer is arranged by the following method. Preferably, the protective layer is arranged onto the negative electrode active material layer by dispersing the materials of the protective layer in a solvent to prepare a slurry for protective layer; the protective layer slurry is applied or coated onto the negative electrode active material layer; and then the protective layer slurry is dried after the coating operation. The coating method to be used is a conventional method, which has been known publicly so far, such as roll coating, dip coating, doctor blade coating, spray coating or curtain coating.

A concentration of solid contents within the slurry for protective layer preferably falls in a range of from 20% by mass or more to 70% by mass or less, more preferably in a range of from 30% by mass or more 60% by mass. When the concentration of solid contents falls in the aforementioned ranges, the solid contents are likely to disperse within the protective layer slurry.

FIG. 1 shows a schematic drawing illustrating a negative electrode for nonaqueous electrolyte secondary battery according to the present embodiment. In FIG. 1, a negative electrode active material layer 5 is arranged on a current collector 1, and a protective layer 6 is arranged on the negative electrode active material layer 5. The negative electrode active material layer 5 comprises first negative electrode active material 2, second negative electrode active material 3, and active material layer binder 4. The protective layer 6 comprises ceramic powder 61, and protective layer binder 62.

In the negative electrode active material layer 5, the flat-shaped first negative electrode active material 2 is arranged so as to make the flat faces parallel with respect to a surface of the current collector 1. Consequently, the negative electrode active material layer 5 has irregularities less in the surface.

In the protective layer 6 shown in FIG. 1, the multiple ceramic powders 61 are arranged to follow along the irregularities in a surface of the negative electrode active material layer 5. The protective layer binder 62 is arranged in interspaces between the individual ceramic powders 61, and are arranged between the ceramic powder 61 and the negative electrode active material layer 5.

Since the negative electrode active material layer 5 has irregularities less in the surface, the protective layer 6 is able to cover the surface of the negative electrode active material layer 5, even without making the protective layer 6 thicker in the thickness. Moreover, since the negative electrode active material layer 5 has irregularities less in the surface, the uneven thickness in the protective layer 6 is reduced.

In the protective layer 6, the multiple ceramic powders 61 are bound to each other by the protective layer binder 62. Moreover, the ceramic powder 61 and the negative electrode active material layer 5 are bound together by the protective layer binder 62. In the protective layer 6, pores 7 are formed in interspaces between the individual ceramic powders 61, between the negative electrode active material layer 5 and the ceramic powder 61, and between the ceramic powder 61 and the protective layer binder 62.

Nonaqueous Electrolyte Secondary Battery

A nonaqueous electrolyte secondary battery according to the present invention comprises the aforementioned negative electrode for nonaqueous electrolyte secondary battery, and further comprises a positive electrode, a separator and an electrolyte, which are not limited especially.

The positive electrode comprises a current collector, and a positive electrode active material layer bound together onto the current collector. The positive electrode active material layer includes a positive electrode active material, and a binder; and further includes a conductive additive and the other additive agents, if needed. The positive electrode active material, conductive additive and binder are not restricted at all especially; namely, any positive electrode active materials, conductive additives and binders used in nonaqueous electrolyte secondary batteries may be used therefor. For example, the conductive additive and binder are the same as the conductive additives and binders explained for the present negative electrode.

The positive electrode active material to be used is one of positive electrode active materials comprising a lithium-containing compound or the other metallic compounds. One of the following lithium-containing compounds is used, for instance: lithium/cobalt composite oxides having a lamellar structure; lithium/nickel composite oxides having a lamellar structure; lithium/manganese composite oxide having a spinel structure; lithium-and-cobalt containing composite metallic oxides having a lamellar structure which is expressed by a general formula: $Li_aCo_pNi_qMn_rD_sO_x$ (where "D" is at least one member selected from the group consisting of Al, Mg, Ti, Sn, Zn, W, Zr, Mo, Fe and Na, "p"+"q"+"r"+"s"=1, 0<"p"<1, 0≤"q"<1, 0≤"r"<1, 0≤"s"<1, 0.8≤"a"<2.0, and −0.2≤{"x"−("a"+"p"+"q+"r"+"s")}≤0.2); olivine-type lithium/phosphate composite oxides designated by a general formula: $LiMPO_4$ (where "M" is at least one member selected from the group consisting of Mn, Fe, Co and Ni); fluorinated olivine-type lithium/phosphate composite oxides designated by a general formula: $Li_2MPO_4F$ (where "M" is at least one member selected from the group consisting of Mn, Fe, Co and Ni); silicate-system-structured lithium composite oxides designated by a general formula: $Li_2MSiO_4$ (where "M" is at least one member selected from the group consisting of Mn, Fe, Co and Ni). Moreover, an example of the other metallic compound is as follows: oxides, such as titanium oxide, vanadium oxide or manganese dioxide; or sulfides, such as titanium sulfide or molybdenum sulfide.

The nonaqueous electrolyte includes a solvent, and an electrolyte dissolved in the solvent. Preferably, an additive is further added to the nonaqueous electrolyte, if needed.

The solvent to be used includes one of the following: cyclic esters, linear or chain-shaped esters, or ethers. An example of the cyclic esters is as follows: ethylene carbonate, propylene carbonate, butylene carbonate, gamma-butyrolactone, vinylene carbonate, 2-methyl-gamma-butyrolactone, acetyl-gamma-butyrolactone, and gamma-valerolactone. An example of the linear esters is as follows: dimethyl carbonate, diethyl carbonate, dibutyl carbonate, dipropyl carbonate, methyl ethyl carbonate, alkyl propionate ester, dialkyl malonate ester, and alkyl acetate ester. An example of the ethers is as follows: tetrahydrofuran, 2-methyltetrahydrofuran, 1,4-dioxane, 1,2-dimethoxyethane, 1,2-diethoxyethane, and 1,2-dibutoxyethane.

The electrolyte to be dissolved in the nonaqueous electrolyte is a lithium salt, such as $LiClO_4$, $LiAsF_6$, $LiPF_6$, $LiBF_4$, $LiCF_3SO_3$ or $LiN(CF_3SO_2)_2$, for instance.

The nonaqueous electrolyte to be used is the following solution, for instance: a solution comprising a lithium salt, such as $LiClO_4$, $LiPF_6$, $LiBF_4$ or $LiCF_3SO_3$, dissolved in a concentration of from 0.5 mol/L to 1.7 mol/L approximately in a solvent, such as ethylene carbonate, dimethyl carbonate, propylene carbonate or dimethyl carbonate.

The separator is a constituent element which isolates the positive electrode and negative electrode from one another, but which lets lithium ions pass therethrough while preventing the two electrodes from contacting with one another to result in short-circuiting. The separator to be used includes one of the following, for instance: porous films made of synthetic resin, such as polytetrafluoroethylene, polypropylene or polyethylene; or porous films made of ceramic. The separator is preferably constituted of laminated multiple porous films.

The aforementioned nonaqueous electrolyte secondary battery is preferably mounted on-board in a vehicle. The vehicle involves a vehicle making use of electric energies produced by battery for all or some of the power source. The following are some of the examples of the vehicle: electric automobiles, hybrid automobiles, plug-in hybrid automobiles, hybrid railroad vehicles, electric-powered forklifts, electric wheelchairs, electric-power-assisted bicycles, and electric-powered two-wheel vehicles.

Having been explained so far are the embodiment modes of the present invention. However, the present invention is not limited to the aforementioned embodiment modes at all. The present invention is implemented in various modes with modifications and improvements, etc., which one of ordinary skill in the art carries out.

EXAMPLES

Hereinafter, the present invention will be explained in more detail while giving examples.

Readying Negative Electrode Active Material

As negative electrode active materials, an Si/C composite powder designated below, SiO of which the average particle diameter "$D_{50}$" was 4 μm, and a natural graphite powder of which the average particle diameter "$D_{50}$" was 15 μm were made ready.

Production of Si/C Composite Powder

A mixed solution of 7-mL HF aqueous solution with 46%-by-mass concentration and 56-mL HCl aqueous solution with 36%-by-mass concentration was held at 0° C. in an ice bath. Within an argon-gas flow, the mixed solution was stirred after adding 3.3-g $CaSi_2$ to the mixed solution. The mixed solution was subjected to a temperature increase up to room temperature after confirming the completion of bubbling, and was further stirred for another two hours at room temperature. Thereafter, the mixed solution was furthermore stirred for extra 10 minutes after adding 20-mL distilled water to the mixed solution. On the occasion, a yellow-colored powder floated.

The obtained mixed solution was filtered. The obtained residual was washed with 10-mL ethanol after washing the residual with 10-mL distilled water. The post-washing residual was vacuum dried to obtain 2.5-g lamellar polysilane.

The lamellar polysilane was weighed out in an amount of one gram. Then, the lamellar polysilane was subjected to a heat treatment, which was carried out while retaining the lamellar polysilane at 500° C. for one hour in an argon-gas atmosphere which included $O_2$ in an amount of 1% by volume or less, to obtain a silicon material.

The obtained silicon material was put in a rotary kiln-type reactor vessel to carry out a carbonizing step by thermal CVD under such conditions as at 850° C. and for 5-minute residence time under propane-gas ventilation. The reactor vessel had a furnace core tube disposed in the horizontal direction. The furnace core tube was set to rotate at a revolving speed of 1 rpm. The furnace core tube had a baffle plate disposed on the inner peripheral wall. The contents were stirred during the reaction, because the reactor vessel was constructed so as to let contents, which deposited on the baffle plate, fall down from the baffle plate at a predetermined height as the furnace core tube rotated.

The Si/C composite powder obtained at the carbonizing step was labeled a negative electrode active material according to a first experimental example.

An average particle diameter "$D_{50}$" of the Si/C composite powder was measured by a laser diffraction scattering grain size distribution measurement method. The average particle diameter "$D_{50}$" of the Si/C composite powder was 5 μm.

Measurement of Aspect Ratio

The aforementioned Si/C composite powder was subjected to an SEM observation to measure the major-axis length "a" and minor-axis length "b" in a quantity of 10 pieces which were selected arbitrarily. The major-axis lengths "a" fell in a range of from 4 μm to 16 μm, and the minor-axis lengths "b" were 2 μm. The aspect ratios defined as "a"/"b" fell in a range of from two to eight respectively, and an average of the aspect ratios was five.

The major-axis lengths and minor-axis lengths of the SiO were measured in the same way. The major-axis lengths of the SiO were 5 μm, and the minor-axis lengths fell in a range of from 3.5 μm to 5 μm. The respective aspect ratios fell within a range of from one to 1.43, and an average of the aspect ratios was 1.2.

The major-axis lengths and minor-axis lengths of the natural graphite powder were measured in the same way. The major-axis lengths of the natural graphite powder fell in a range of from 15 μm to 20 μm, and the minor-axis lengths fell in a range of from 15 to 20 μm. Each of the aspect ratios fell in a range of from one to 1.3, and an average of the aspect ratios was 1.2.

Fabrication of Negative Electrode

Fabrication of Slurry for Protective Layer

As a ceramic powder making a protective layer, an $Al_2O_3$ powder (produced by SUMITOMO CHEMICAL Co., Ltd.) of which the average particle diameter "$D_{50}$" equaled 540 nm was made ready. As binders for protective layer, the following were made ready: polyvinyl alcohol (hereinafter referred to as "PVA") of which the mass average molecular weight (hereinafter referred to as "Mw") equaled 2,200 and the glass transition point "Tg" was 85° C.; and polyacrylic acid (hereinafter referred to as "PAA") of which the glass transition point "Tg" was 106° C.

Slurry I for protective layer was obtained by dissolving the PVA in water and then adding the $Al_2O_3$ powder, and mixing the raw materials with a disperser for 30 minutes. A mass ratio between the water, PVA and $Al_2O_3$ was set to make such a ratio as Water/PVA/$Al_2O_3$=70/3.3/26.7 by percentage. Protective Layer Slurry I had 30%-by-mass solid-content concentration. In Protective Layer Slurry I, a PVA/$Al_2O_3$ compounding ratio was PVA/$Al_2O_3$=11/89 by mass based on 100 parts by mass of a sum of the PVA and $Al_2O_3$.

Other than the mass ratio between the water, PVA and $Al_2O_3$ was set to make such a ratio as Water/PVA/$Al_2O_3$=70/1.5/28.5 by percentage, Slurry II for protective layer was fabricated in the same manner as Protective Layer Slurry I. Protective Layer Slurry II had 30%-by-mass solid-content concentration. In Protective Layer Slurry II, a PVA/$Al_2O_3$ compounding ratio was PVA/$Al_2O_3$=5/95 by mass based on 100 parts by mass of a sum of the PVA and $Al_2O_3$.

Other than the PVA was changed to PAA, Slurry III for protective layer was produced in the same manner as Protective Layer Slurry I. Protective Layer Slurry III had 30%-by-mass solid-content concentration. In Protective Layer Slurry III, a PAA/Al$_2$O$_3$ compounding ratio was PAA/Al$_2$O$_3$=11/89 by mass based on 100 parts by mass of a sum of the PAA and Al$_2$O$_3$.

Negative Electrode According to First Example

The Si/C composite powder which served as the negative electrode active material according to the first experimental example, a natural graphite powder, acetylene black (hereinafter referred to as "AB") serving as a conductive additive, and a polyamide-imide resin (hereinafter referred to as "PAI") serving as a binding agent were mixed with each other in a proportion of 58 parts by mass, 24.5 parts by mass, 7.5 parts by mass, and 10 parts by mass, respectively. The mixture was dispersed in a proper amount of N-methy-2-pyrrolidone (hereinafter referred to as "NMP") to fabricate a slurry for negative electrode active material layer.

Onto a copper foil, which served as a current collector for negative electrode and of which the thickness was 20 μm, the slurry was coated or applied so as to make a film shape using a doctor blade. After drying the current collector with the slurry coated thereon, the current collector was pressed to obtain a joined substance. On the occasion, a density of the negative electrode active material layer was set so as to be 1.2 g/cm$^3$. Note that a "density of the negative electrode active material layer" mentioned herein was computed from such an equation as (Negative Electrode Active Material Layer's Mass (g))÷{(Negative Electrode Active Material Layer's Thickness (cm))×(Negative Electrode Active Material Layer's Area (cm$^2$))}. The joined substance was heat dried at 200° C. for two hours with a vacuum drier to obtain a copper foil on which a negative electrode active material layer was formed. The copper foil with the negative electrode active material layer formed thereon was labeled Negative Electrode "A." The negative electrode active material layer of Negative Electrode "A" had a thickness of 50 μm approximately.

In Negative Electrode "A," a compounding ratio between the Si/C composite powder and the natural graphite powder was (Si/C Composite Powder)/(Natural Graphite Powder) =70.3/29.7 by mass based on 100 parts by mass of a sum of the Si/C composite powder and natural graphite powder.

Onto Negative Electrode "A" mentioned above, Protective Layer Slurry I was coated or applied using an applicator. Negative Electrode "A" with Protective Layer Slurry I coated thereon was heat dried at 200° C. for two hours to make a negative electrode according to a first example. The protective layer of the negative electrode according to the first example had a thickness of 5 μm. Note herein that a "thickness of the protective layer" was found by subtracting a thickness of Negative Electrode "A" from a thickness of the negative electrode according to the first example. The thickness of the respective negative electrode was defined as an average of results calculated at 10 points at 5-mm intervals in each negative electrode.

Negative Electrode According to Second Example

Other than Protective Layer Slurry I was coated or applied thinly, a negative electrode according to a second example was fabricated in the same manner as the negative electrode according to the first example. The protective layer of the negative electrode according to the second example had a thickness of 1.5 μm.

Negative Electrode According to Third Example

Other than fabricating a slurry for negative electrode active material layer by mixing the Si/C composite powder which served as the negative electrode active material according to the aforementioned first experimental example, a natural graphite powder, AB, and PAI with each other in a proportion of 70 parts by mass, 12.5 parts by mass, 7.5 parts by mass, and 10 parts by mass, respectively; and then by dispersing the mixture in a proper amount of NMP, Negative Electrode "B" was fabricated in the same manner as Negative Electrode "A." In Negative Electrode "B," a compounding ratio between the Si/C composite powder and the natural graphite powder was (Si/C Composite Powder)/ (Natural Graphite Powder)=84.8/15.2 by mass based on 100 parts by mass of a sum of the Si/C composite powder and natural graphite powder.

Onto Negative Electrode "B," Protective Layer Slurry I was coated or applied using an applicator. Negative Electrode "B" with Protective Layer Slurry I coated thereon was heat dried at 200° C. for two hours to turn the workpiece into a negative electrode according to a third example. The protective layer of the negative electrode according to the third example had a thickness of 5 μm.

Negative Electrode According to Fourth Example

Other than fabricating a slurry for negative electrode active material layer by mixing the Si/C composite powder which served as the negative electrode active material according to the aforementioned first experimental example, AB, and PAI with each other in a proportion of 80 parts by mass, 10 parts by mass, and 10 parts by mass, respectively; and then by dispersing the mixture in a proper amount of NMP, Negative Electrode "C" was fabricated in the same manner as Negative Electrode "A." In Negative Electrode "C," a compounding ratio between the Si/C composite powder and the natural graphite powder was (Si/C Composite Powder)/(Natural Graphite Powder)=100/0 by mass based on 100 parts by mass a sum of the Si/C composite powder and natural graphite powder.

Onto Negative Electrode "C," Protective Layer Slurry I was coated or applied using an applicator. Negative Electrode "C" with Protective Layer Slurry I coated thereon was heat dried at 200° C. for two hours to turn the workpiece into a negative electrode according to a fourth example. The protective layer of the negative electrode according to the fourth example had a thickness of 5 μm.

Negative Electrode According to Fifth Example

Other than Protective Layer Slurry II was used, a negative electrode according to a fifth example was fabricated in the same manner as the negative electrode according to the first example. The protective layer of the negative electrode according to the fifth example had a thickness of 5 μm.

Negative Electrode According to Sixth Example

Other than Protective Layer Slurry III was used, a negative electrode according to a sixth example was fabricated in the same manner as the negative electrode according to the first example. The protective layer of the negative electrode according to the sixth example had a thickness of 5 μm.

Negative Electrode According to First Comparative Example

Other than fabricating a slurry for negative electrode active material layer by mixing the SiO, the natural graphite powder, AB, and PAI with each other in a proportion of 70 parts by mass, 12.5 parts by mass, 7.5 parts by mass, and 10 parts by mass, respectively; and then by dispersing the mixture in a proper amount of NMP, Negative Electrode "D" was fabricated in the same manner as Negative Electrode "A." In Negative Electrode "D," a compounding ratio between the SiO and the natural graphite powder was (SiO)/(Natural Graphite Powder)=84.8/15.2 by mass based on 100 parts by mass of a sum of the SiO and natural graphite powder.

Onto Negative Electrode "D," Protective layer Slurry I was coated or applied using an applicator. Negative Electrode "D" with Protective Layer Slurry I coated thereon was heat dried at 200° C. for two hours to turn the workpiece into a negative electrode according to a first comparative example. The protective layer of the negative electrode according to the first comparative example had a thickness of 5 µm.

Observation by Scanning Electron Microscope (Hereinafter Referred to "SEM")

A section of the negative electrode according to the first example, and a section of the negative electrode according to the first comparative example were observed by an SEM at 1,000× magnification to acquire the images.

The acquired images were subjected to image processing to acquire a curved line of the cross section of the negative electrode active material layers on the surface opposite to the current-collector-side surface.

Since the aforementioned curved line had not any great difference in the longitudinal direction, an arbitrary 100 µm location was specified in the longitudinal direction, and then the location was regarded as a representative portion to express the entirety.

A first parallel line (or a peak line), and a second parallel line (or a valley line) were specified to gauge or mechanically measure a distance between the two parallel lines. The first parallel line passed through a top point (or an uppermost point) in the thickness direction of the curved line of the cross section in the specified location, and was parallel to the surface of the current collector. The second parallel line passed through a bottom point (or a lowermost point) in the thickness direction of the curved line, and was parallel to the surface of the current collector. Then, the distance between the two parallel lines was gauged or measured mechanically. The thus obtained distance was defined as a maximum height.

Figure 2:
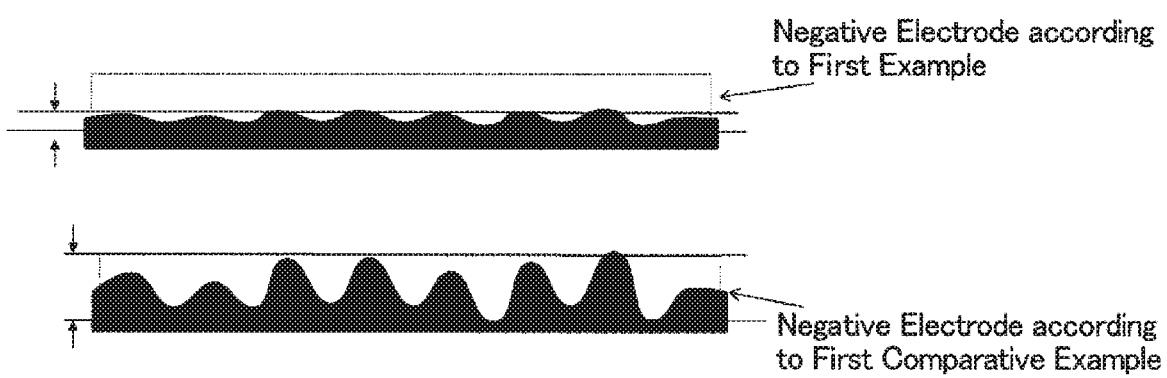
FIG. 2 is a schematic diagram comparing a surface roughness in a section of a negative electrode according to a first example with a surface roughness in a negative electrode according to a first comparative example.

FIG. 2 shows a schematic diagram comparing the curved line of the cross section of the negative electrode according to the first example and the curved line of the cross section of the negative electrode according to the first comparative example. In FIG. 2, the distances were measured as maximum heights at locations held between the arrows. The negative electrode active material layer of the negative electrode according to the first example had a maximum height of 2 µm, whereas the negative electrode active material layer of the negative electrode according to the first comparative example had a maximum height of 4 µm.

The flat-shaped first negative electrode active material was used in the negative electrode according to the first example. The spherical-shaped negative electrode active material was used in the negative electrode according to the first comparative example. The average particle diameter "$D_{50}$" of the first negative electrode active material used in the negative electrode according to the first example, and the average particle diameter "$D_{50}$" of the negative electrode active material used in the negative electrode according to the first comparative example were 5 µm, and 4 µm, respectively. Thus, there was not so much difference between the sizes. However, the maximum height of the negative electrode active material layer of the negative electrode according to the first example was small remarkably, compared with the maximum height of the negative electrode active material layer of the negative electrode according to the first comparative example. In the observation on the cross section of the negative electrode according to the first example, the first negative electrode active material was observed to be arranged so as to make the flat face of the flat-shaped first negative electrode active material parallel with respect to the current collector. According to the results of the SEM observation, the surface roughness of the negative electrode active material layer became smaller when the negative electrode active material layer included the flat-shaped first negative electrode active material.

Moreover, although both the thicknesses of the protective layers of the negative electrode according to the first example and negative electrode according to the first comparative example were 5 µm, the maximum height of the negative electrode active material layer of the negative electrode according to the first example was different from the maximum height of the negative electrode active material layer of the negative electrode according to the first comparative example. Consequently, in the negative electrode according to the first comparative example of which the negative electrode active material layer had the large maximum height, the protective layer came to have very thin thicknesses at locations where the surface of the negative electrode active material layer had high heights, so that the protective layer of the negative electrode according to the first comparative example exhibited large unevenness in the thickness. Note that maximum heights of the negative electrode active material layer of each of the negative electrodes according to the second through sixth examples were measured in the same way. The negative electrode active material layers of the negative electrodes according to the second through sixth examples had a maximum height of 2 µm, respectively.

Fabrication of Laminated-Type Lithium-Ion Secondary Battery

Laminated-Type Lithium-Ion Secondary Battery According to First Example

The negative electrode according to the first example was cut out to a predetermined configuration (e.g., a rectangular shape in which the negative electrode active material layer exhibited an area of 26 mm×31 mm). Then, a laminated-type lithium-ion secondary battery according to the first example, in which the cut-out negative electrode was used as a negative electrode, was fabricated as described below.

A positive electrode was fabricated in the following manner. $LiNi_{0.5}Co_{0.2}Mn_{0.3}O_2$, which served as a positive electrode active material and of which the average particle diameter "$D_{50}$" was 5 µm, AB, which served as a conductive additive, and polyvinylidene fluoride (or PVDF), which served as a binding agent, were set to make 94 parts by mass, 3 parts by mass, and 3 parts by mass, respectively; and were then mixed with each other to turn the raw materials into a mixture. The mixture was dispersed in a proper amount of NMP to fabricate a slurry.

An aluminum foil, which served as a current collector and of which the thickness was 15 µm, was made ready. The slurry was put on the current collector, and was then coated or applied so as to let the slurry make a film shape using a doctor blade. The obtained sheet was dried at 80° C. for 20 minutes so that NMP was evaporated to be removed. Thereafter, the current collector, and the coated substance on the current collector were adhesion joined to one another firmly by a roll pressing machine. On the occasion, a density of the positive electrode active material layer was set so as to be 2.9 g/cm$^3$. Note that a "density of the positive electrode active material layer" mentioned herein was computed by such an equation as (Positive Electrode Active Material Layer's Mass (g))÷{(Positive Electrode Active Material Layer's Thickness (cm))×(Positive Electrode Active Material Layer's Area (cm$^2$))}. The joined substance was heated at 120° C. for six hours with a vacuum drier. The post-heating joined substance was cut out to a predetermined configuration (e.g., a 25 mm×30 mm rectangular shape) to turn the workpiece into a positive electrode. The positive electrode active material layer had a thickness of 90 μm approximately.

The aforementioned positive electrode, and the negative electrode according to the first example were used to manufacture a laminated-type lithium-ion secondary battery. To be concrete, between the positive electrode and the negative electrode according to the first example, a rectangle-shaped sheet serving as a separator and comprising a polypropylene resin with 27×32 mm in size and 25 μm in thickness was interposed or held to turn the positive electrode, negative electrode and separator into an electrode assembly.

After covering the electrode assembly with laminated films in which two pieces made a pair and then sealing the laminated films at the three sides, a nonaqueous electrolyte was injected into the laminated films which had been turned into a bag shape. As the nonaqueous electrolyte, a solution was used: the solution comprised a solvent in which fluoroethylene carbonate (or FEC), ethylene carbonate (or EC), ethyl methyl carbonate (or EMC), and dimethyl carbonate (or DMC) had been mixed with each other in such a ratio as FEC:EC:EMC:DMC equaled 4:26:30:40 by volume; and LiPF$_6$ dissolved in the solvent so as to make 1 mol/L. Thereafter, the remaining one side was sealed to obtain a laminated-type lithium-ion secondary battery in which the four sides were sealed air-tightly and in which the electrode assembly and nonaqueous electrolyte were closed hermetically. Note that the positive electrode and negative electrode were equipped with a tab connectable electrically with the outside, respectively, and the tabs extended out partially to the outside of the laminated-type lithium-ion secondary battery. Through the steps as described above, a laminated-type lithium-ion secondary battery according to the first example was fabricated.

Laminated-Type Lithium-Ion Secondary Battery According to Second Example

Other than the negative electrode according to the first example in the laminated-type lithium-ion secondary battery according to the first example was altered to the negative electrode according to the second example, a laminated-type lithium-ion secondary battery according to the second example was fabricated in the same manner as the laminated-type lithium-ion secondary battery according to the first example.

Laminated-Type Lithium-Ion Secondary Battery According to Third Example

Other than the negative electrode according to the first example in the laminated-type lithium-ion secondary battery according to the first example was altered to the negative electrode according to the third example, a laminated-type lithium-ion secondary battery according to the third example was fabricated in the same manner as the laminated-type lithium-ion secondary battery according to the first example.

Laminated-Type Lithium-Ion Secondary Battery According to Fourth Example

Other than the negative electrode according to the first example in the laminated-type lithium-ion secondary battery according to the first example was altered to the negative electrode according to the fourth example, a laminated-type lithium-ion secondary battery according to the fourth example was fabricated in the same manner as the laminated-type lithium-ion secondary battery according to the first example.

Laminated-Type Lithium-Ion Secondary Battery According to Fifth Example

Other than the negative electrode according to the first example in the laminated-type lithium-ion secondary battery according to the first example was altered to the negative electrode according to the fifth example, a laminated-type lithium-ion secondary battery according to the fifth example was fabricated in the same manner as the laminated-type lithium-ion secondary battery according to the first example.

Laminated-Type Lithium-Ion Secondary Battery According to Sixth Example

Other than the negative electrode according to the first example in the laminated-type lithium-ion secondary battery according to the first example was altered to the negative electrode according to the sixth example, a laminated-type lithium-ion secondary battery according to the sixth example was fabricated in the same manner as the laminated-type lithium-ion secondary battery according to the first example.

Laminated-Type Lithium-Ion Secondary Battery According to First Comparative Example Other than the negative electrode according to the first example in the laminated-type lithium-ion secondary battery according to the first example was altered to the negative electrode according to the first comparative example, a laminated-type lithium-ion secondary battery according to the first comparative example was fabricated in the same manner as the laminated-type lithium-ion secondary battery according to the first example.

Evaluation on Safety of Lithium-Ion Secondary Battery

Nail Penetration Test

To the laminated-type lithium-ion secondary batteries according to the first through sixth examples and first comparative example, a safety evaluation was carried out by a nail penetration test. To be concrete, the respective batteries were subjected to a CC charging (i.e., constant-current charging) mode until 4.5 V was attained at a current value of 3.0 A. Thereafter, the charging operation was kept going continuously until the batteries maintained a voltage falling within a range of 4.5 V÷0.02 V, and then the charging operation was stopped when the total-charging time became five hours. Note that each of the laminated-type lithium-ion secondary batteries had a capacity of 6 Ah.

The respective laminated-type lithium-ion secondary batteries, to which the above-mentioned charging treatments were carried out, were arranged on a constriction plate having pores with a diameter of 20 mm. A pressing machine, to which nails were installed at the top, was arranged over the constriction plate. The nails were moved from up above to down below at a rate of 20 mm/sec until the nails penetrated through the laminated-type lithium-ion secondary batteries disposed on the constriction plate and then the leading end of the nails was located inside the pores in the constriction plate. A temperature measuring device, which was capable of measuring surface temperatures, was installed to the laminated-type lithium-ion secondary batteries on the surface. Note that the nails were made of stainless steel (e.g., S45C prescribed in JIS G 4051), and had Φ 8 mm in diameter and 60 degrees in nail leading-end or tip angle. Measured were loads applied to the nails, currents, and voltages. The nail penetration test was carried out while measuring the surface temperatures of the laminated-type lithium-ion secondary batteries at room temperature and in air. By the nail penetration test, the positive electrode and negative electrode of the laminated-type lithium-ion secondary batteries were short-circuited. Times at which the voltages dropped suddenly were regarded the time of short-circuiting, respectively.

A short-circuiting resistances at the time of short-circuiting was calculated from a voltage-drop magnitude using the following equation.

(Short-circuiting Resistance (Ω))=[{(Cell Voltage (V))−(Voltage-drop Magnitude (V))}/(Voltage-drop Magnitude (V))]×(Cell's Internal Resistance (Ω))−(Cell's Internal Resistance (Ω))

Note herein that the "cell's internal resistance" was a value which had been measured in advance prior to the nail penetration test. The "cell voltage" was an actually-measured value of a voltage between the positive and negative electrodes of the external terminals in a battery. The "voltage-drop magnitude" was a value which fluctuated between a voltage before starting the nail penetration test and another voltage after the start. For example, the voltage-drop magnitude was regarded 1.5 V when the voltage lowered from 4.5 V to 3 V.

Table 1 sets forth all together results of measuring the short-circuiting resistances of the laminated-type lithium-ion secondary batteries according to the first through fourth examples and the first comparative example, and the surface temperatures of the laminated-type lithium-ion secondary batteries at the time of short-circuiting. Table 1 sets forth the surface temperature at the time of short-circuiting as a "Cell Heat-generation Temperature."

TABLE 1

|  | Amount of First Negative Electrode Active Material in Negative Electrode Active Material Layer (Parts by Mass) | (First Negative Electrode Active Material)/ (Second Negative Electrode Active Material) (Compounding Ratio by Mass) | First Negative Electrode Active Material's Aspect Ratio (Average) | Second Negative Electrode Active Material's Aspect Ratio (Average) | Maximum Height in Negative Electrode Active Material Layer (μm) | Protective Layer's Film Thickness (μm) | Short-Circuiting Resistance (Ω) | Cell Heat-generation Temp. (° C.) |
|---|---|---|---|---|---|---|---|---|
| 1st Ex. | 58 | 70.3/29.7 | 5 | 1.2 | 2 | 5 | 15 | 49 |
| 2nd Ex. | 58 | 70.3/29.7 | 5 | 1.2 | 2 | 1.5 | 10 | 58 |
| 3rd Ex. | 70 | 84.8/15.2 | 5 | 1.2 | 2 | 5 | 14 | 52 |
| 4th Ex. | 80 | 100/0 | 5 | — | 2 | 5 | 14 | 56 |
| 1st Comp. Ex. | 70 | 84.8/15.2 | 1.2 | 1.2 | 4 | 5 | 2 | 112 |

From the results shown in Table 1, when comparing the short-circuiting resistances and cell heat-generation temperatures of the laminated-type lithium-ion secondary batteries according to the first through fourth examples with the short-circuiting resistance and cell heat-generation temperature of the laminated-type lithium-ion secondary battery according to the first comparative example, the short-circuiting resistance of the laminated-type lithium-ion secondary battery according to the first comparative example was low considerably, and the cell heat-generation temperature was high considerably. From the facts, using the first negative electrode active material of which the aspect ratio was from two to eight resulted in enhancing safety by raising the short-circuiting resistance but by lowering the cell heat-generation temperature.

When comparing the short-circuiting resistances and cell heat-generation temperatures of the laminated-type lithium-ion secondary batteries according to the first example, the third example and the fourth examples with each other, the respective short-circuiting resistances and cell heat-generation temperatures were hardly different from each other. From the facts, when the flat-shaped first negative electrode active material was included in an amount of 50 parts by mass or more within the negative electrode active material layer, safety was enhanced. Moreover, the laminated-type lithium-ion secondary battery according to the fourth example was a secondary battery which did not include any second negative electrode active material at all. From the fact, even when the second negative electrode active material was not included, but when the flat-shaped first negative electrode active material was included in an amount of 50 parts by mass or more within the negative electrode active material layer, safety was enhanced.

According to the maximum heights in the surface of the negative electrode active material layers of the laminated-type lithium-ion secondary batteries according to the first example and second example, the maximum height of the negative electrode active material layer became smaller when the negative electrode active material layer included the flat-shaped first negative electrode active material.

Moreover, since the laminated-type lithium-ion secondary battery according to the second example comprising the protective layer of which the thickness was 1.5 µm exhibited the short-circuiting resistance and cell heat-generation temperature equivalent to the short-circuiting resistance and cell heat-generation temperature exhibited by the laminated-type lithium-ion secondary battery according to the first example comprising the protective layer of which the thickness was 5 µm. Thus, the laminated-type lithium-ion secondary battery according to the second example was also confirmed to show high safety. From the fact, since the negative electrode active material layer of the laminated-type lithium-ion secondary battery according to the second example had the small maximum height, the protective layer was formed without unevenness in the thickness so that the safety was secured, even when the protective layer had the small thickness.

Table 2 sets forth all together results of measuring the short-circuiting resistances of the laminated-type lithium-ion secondary batteries according to the first example, the fifth example and the sixth example, and the surface temperatures of the laminated-type lithium-ion secondary batteries at the time of short-circuiting.

TABLE 2

| | Binder for Protective Layer | (Binder for Protective layer)/(Ceramic Powder) (Compounding Ratio by Mass) | Short-circuiting Resistance (Ω) | Cell Heat-generation Temperature (° C.) |
|---|---|---|---|---|
| 1st Example | PVA | 11/89 | 15 | 49 |
| 5th Example | PVA | 5/95 | 13 | 52 |
| 6th Example | PAA | 11/89 | 13 | 53 |

According to the results shown in Table 2, when comparing the short-circuiting resistances and cell heat-generation temperatures of the laminated-type lithium-ion secondary batteries according to the fifth example and sixth examples with the short-circuiting resistance and cell heat-generation temperature of the laminated-type lithium-ion secondary battery according to the first example, the respective short-circuiting resistances and cell heat-generation temperatures were hardly different from each other. From the facts, the following were understood: the negative electrode active material layer's superficial state resulting from the content of the flat-shaped first negative electrode active material is important; the types of the binders for protective layer affect the characteristics less; and the compounding ratios between the protective layer binders and the ceramic powder affect the characteristics less.

The invention claimed is:

1. A negative electrode for nonaqueous electrolyte secondary battery, the negative electrode comprising:
   a current collector;
   a negative electrode active material layer arranged on a surface of the current collector; and
   a protective layer arranged on a top surface of the negative electrode active material layer;
   the negative electrode active material layer including an active material layer binder, and a first negative electrode active material having an aspect ratio defined as "a"/"b" to fall in a range of from two or more to eight or less when a length of a major axis thereof is defined "a" and a length of a minor axis thereof is defined "b";
   the protective layer including a ceramic powder.

2. The negative electrode for nonaqueous electrolyte secondary battery as set forth in claim 1, wherein the first negative electrode active material includes Si.

3. A negative electrode for nonaqueous electrolyte secondary battery, the negative electrode comprising:
   a current collector,
   a negative electrode active material layer arranged on a surface of the current collector; and
   a protective layer arranged on a surface of the negative electrode active material layer;
   the negative electrode active material layer including a first negative electrode active material having an aspect ratio as "a"/"b" to fall in a range of from two or more to eight or less when a length of a major axis thereof is defined "a" and a length of a minor axis thereof is defined "b";
   the protective layer including a ceramic powder,
   wherein the negative electrode active material layer further includes a second negative electrode active material having the aspect ratio which falls in a range of from one or more to less than two.

4. The negative electrode for nonaqueous electrolyte secondary battery as set forth in claim 3, wherein the second negative electrode active material includes graphite.

5. The negative electrode for nonaqueous electrolyte secondary battery as set forth in claim 3, wherein an average of the aspect ratios of the first negative electrode active material is more than an average of the aspect ratios of the second negative electrode active material.

6. The negative electrode for nonaqueous electrolyte secondary battery as set forth in claim 1, wherein an average particle diameter "$D_{50}$" of the first negative electrode active material falls in a range of from 0.3 µm or more to 20 µm or less.

7. The negative electrode for nonaqueous electrolyte secondary battery as set forth in any claim 1, wherein the first negative electrode active material includes a silicon material having a structure in which plate-shaped silicon bodies are laminated in a thickness direction thereof.

8. The negative electrode for nonaqueous electrolyte secondary battery as set forth in claim 3, wherein an average particle diameter "$D_{50}$" of the second negative electrode active material falls in a range of from 0.1 µm or more to 20 µm or less.

9. The negative electrode for nonaqueous electrolyte secondary battery as set forth in claim 1, wherein the first negative electrode active material is 50 parts by mass or more based on 100 parts by mass of the negative electrode active material layer.

10. The negative electrode for nonaqueous electrolyte secondary battery as set forth in claim 1, wherein:
    a maximum height of a surface of the negative electrode active material layer is 2 µm or less; and the maximum height is defined as a distance between first and second parallel lines in a scanning electron microscope image in a cross section of the negative electrode active material layer;

wherein the first parallel line passing through a top point in the thickness direction of a curved line on the surface opposite to the current-collector-side surface of the cross section of the negative electrode active material layer and parallel to the surface of the current collector;

wherein the second parallel line passing through a bottom point in the thickness direction of the curved line and parallel to the surface of the current collector.

11. The negative electrode for nonaqueous electrolyte secondary battery as set forth in claim 1, wherein an average particle diameter "$D_{50}$" of the ceramic powder falls in a range of from 0.1 μm or more to 2 μm or less.

12. The negative electrode for nonaqueous electrolyte secondary battery as set forth in claim 1, wherein a thickness of the protective layer falls in a range of from 1 μm or more to 6 μm or less.

13. The negative electrode for nonaqueous electrolyte secondary battery as set forth in claim 1, wherein the protective layer includes a water-based binder.

14. The negative electrode for nonaqueous electrolyte secondary battery as set forth in claim 13, wherein the water-based binder is a water-soluble binder.

15. The negative electrode for nonaqueous electrolyte secondary battery as set forth in claim 14, wherein the water-soluble binder is polyvinyl alcohol or polyacrylic acid.

16. A nonaqueous electrolyte secondary battery comprising the negative electrode for nonaqueous electrolyte secondary battery as set forth in claim 1.

\* \* \* \* \*